United States Patent [19]

Friesen et al.

[11] Patent Number: 5,002,590
[45] Date of Patent: Mar. 26, 1991

[54] COUNTERCURRENT DEHYDRATION BY HOLLOW FIBERS

[75] Inventors: Dwayne T. Friesen; Roderick J. Ray; David D. Newbold, all of Bend, Oreg.

[73] Assignee: Bend Research, Inc., Bend, Oreg.

[21] Appl. No.: 409,428

[22] Filed: Sep. 19, 1989

[51] Int. Cl.$^5$ .................... B01D 53/22; B01D 71/70
[52] U.S. Cl. .......................... 55/16; 55/68; 55/158
[58] Field of Search .................. 55/16, 68, 158

[56] References Cited

U.S. PATENT DOCUMENTS

| | | | |
|---|---|---|---|
| 3,511,031 | 5/1970 | Ketteringham et al. | 55/158 |
| 3,735,559 | 5/1973 | Salemme al. | 55/16 |
| 4,214,020 | 7/1980 | Ward et al. | 55/16 X |
| 4,230,463 | 10/1980 | Henis et al. | 55/16 |
| 4,497,640 | 2/1985 | Fournie et al. | 55/16 |
| 4,568,579 | 2/1986 | Watson | 55/16 X |
| 4,583,996 | 4/1986 | Sakata et al. | 55/16 |
| 4,664,669 | 5/1987 | Ohyabu et al. | 55/16 X |
| 4,666,644 | 5/1987 | Watson | 55/16 X |
| 4,687,578 | 8/1987 | Stookey | 55/158 X |
| 4,718,921 | 1/1988 | Makino et al. | 55/16 |
| 4,725,359 | 2/1988 | Ray | 210/640 |
| 4,734,106 | 3/1988 | Gollan | 55/16 |
| 4,755,193 | 7/1988 | Higashimura et al. | 55/16 |
| 4,758,251 | 7/1988 | Swedo et al. | 55/16 |
| 4,781,733 | 11/1988 | Babcock et al. | 55/16 |
| 4,783,201 | 11/1988 | Rice et al. | 55/16 |
| 4,793,830 | 12/1988 | Murphy et al. | 55/16 |
| 4,844,719 | 7/1989 | Toyomoto et al. | 55/16 |
| 4,857,081 | 8/1989 | Taylor | 55/16 |
| 4,863,496 | 9/1989 | Ekiner et al. | 55/16 X |
| 4,871,378 | 10/1989 | Pinnau | 55/16 |
| 4,871,461 | 10/1989 | Karakane et al. | 55/16 X |
| 4,875,908 | 10/1989 | Kikukawa et al. | 55/16 |

FOREIGN PATENT DOCUMENTS

| | | | |
|---|---|---|---|
| 0159783 | 10/1985 | European Pat. Off. | 55/16 |
| 53-145343 | 12/1978 | Japan | 55/16 |
| 54-006345 | 1/1979 | Japan | 55/16 |
| 54-152679 | 12/1979 | Japan | 55/16 |
| 61-229830 | 10/1986 | Japan | 55/16 |
| 62-057630 | 3/1987 | Japan | 55/16 |
| 62-241527 | 10/1987 | Japan | 55/16 |
| 63-209731 | 8/1988 | Japan | 55/16 |
| 63-236517 | 10/1988 | Japan | 55/16 |
| 01-070124 | 3/1989 | Japan | 55/16 |

*Primary Examiner*—Robert Spitzer
*Attorney, Agent, or Firm*—Chernoff, Vilhauer, McClung & Stenzel

[57] ABSTRACT

A gas dehydration method and apparatus are disclosed which utilize lumen-side feed, thin-film which is highly permeable, such composite membranes being used in a module wherein the permeate flows countercurrent to the flow of the feed.

17 Claims, 2 Drawing Sheets

COUNTERCURRENT DEHYDRATION BY HOLLOW FIBERS

This invention was made with government support under Contract No. N00167-88-C-0026 awarded by the U.S. Department of Defense. The government has certain rights in this invention.

BACKGROUND OF THE INVENTION

Hollow fiber membrane-based dehydration is known. See, for example, U.S. Pat. Nos. 4,783,201, 4,725,359, 4,718,921, 4,497,640, 4,583,996 and 3,511,031. However, for a variety of reasons, no known prior art approach has been able to achieve a high degree of efficiency while maintaining a low-cost, simple design. The reason for this appears to be that, while the theory of gas dehydration is ostensibly simple, in practice the task often proves to be quite complex due to an unusually large number of factors that come into play when hollow fiber separation membranes are used, such as the resistance, selectivity and permeability of the permselective layer, the resistance, selectivity, and permeability of the support fibers, and the resistance of the module. In addition, the relative values of these resistances and the directions of feed and permeate and sweep gases also impact the fluxes of the various permeating species, and thus, the overall performance of the module.

It is therefore an object of the present invention to provide a highly efficient method and apparatus for gas dehydration.

It is another object of the present invention to provide a simply-designed gas dehydration apparatus which does not require a sweep gas.

It is a further object of the present invention to provide a low-cost and easy-to-operate gas dehydration module.

These and other objects, which will become apparent to one of ordinary skill, are accomplished by the present invention, which is summarized and described in detail below.

SUMMARY OF THE INVENTION

The present invention comprises a novel gas dehydration method and apparatus, the latter comprising a bundle of lumen-side feed, thin-film composite hollow fibers arranged substantially parallel to each other in a chamber or module with a permeate port located near the feed end of the module, the composite fibers comprising a support of very high permeability and a thin dense coating on the inside or lumens of the fibers, the flow of the permeate being countercurrent to that of the feed.

DETAILED DESCRIPTION OF THE INVENTION

A good membrane process for dehydration has three essential characteristics. First, the process must be capable of removing water vapor from the feed gas to the desired dewpoint. Second, the water vapor separation takes place with as little loss of feed gas to the permeate as possible. In fact, there is a theoretical minimum feed gas loss for efficient dehydration by membranes. This stems from the fact that the partial pressure of water vapor in the gas leaving as permeate from the membrane module cannot exceed the partial pressure of water vapor in the feed gas entering the membrane module. An efficient membrane process for dehydration will have a feed gas loss that approaches this theoretical minimum. Third, the process must economically perform this separation; in other words, the membrane surface area required to perform a given water vapor separation should be as small as possible.

Consistent with these principles, there are two key elements of an effective hollow fiber dehydration method and apparatus: (1) a membrane that is selective for water vapor over the feed gas to be dried; and (2) a module design that allows removal of the water vapor without excessive losses of feed gas. The impetus of the present inventions lies in the discovery of a method of combining these key elements.

The driving force for the transport of water vapor across a membrane is its partial pressure difference across the membrane. In the case of a composite hollow fiber membrane module, this driving force will be greatest when there is a large differential in the resistance to gas flow of the coating on the lumens of the support fiber on the one hand, and, on the other hand, the sum of the resistances of a gas-phase boundary layer on the lumen side of the membrane, the support fiber itself, and that of a chamber or module containing the fibers. Since water flux through a composite membrane is inversely proportional to the total of all the resistances mentioned above, i.e., the resistances of the coating, of the gas phase boundary layer, of the support fiber, and of the module, achieving high water flux requires that the resistance of the coating (as well as the other resistances) to the permeation of water vapor be low. At the same time, however, to maintain high water selectivity, the relationship of resistances to the flow of gas to be dried must be such that the resistance of the coating is much greater than the sum of the resistances of the gas phase boundary layer, the support fiber and the module. This is so since the selectivity of the overall process toward water over the gas to be dried is the ratio of the sum of all the resistances to gas transport to the sum of all the resistances to water transport. Heretofore, it has been a widely held belief that the only critical factor in achieving highly selective separations by membranes has been the selectivity of the permselective layer of the membrane, and that the characteristics of the support, module and boundary layer were relatively unimportant. Contrary to this conventional wisdom, it has been discovered that a critical rate-limiting factor governing high water flux and selectivity is the resistance of the support of the hollow fiber composite membrane. As an extension of this discovery, it has been found that highly efficient dehydration is obtainable by the use of a highly permeable support fiber with a thin dense coating on the inside or lumens thereof. The highly permeable support permits high water flux therethrough while the thin dense coating on the support allows the adjustment of the permeation rate of the gas to be dried to a low value relative to the permeation rate of the water, yet, quite surprisingly, has no material impact on the water flux through the support, unless the permeability of the coating to water is so low that it approaches the permeability of the support.

In most cases, the partial pressure of water vapor in a gas at saturation is very low. Therefore, the partial pressure driving force for water vapor transport must be provided by one of three methods: (1) the sweep method, in which dry gas from an external source is swept proximate to the permeate side of the membrane; (2) the vacuum method, in which a vacuum is applied to the permeate side of the membrane; or (3) the dilution method, in which the permeate is left at, for example, atmospheric pressure, but a small percentage of the feed gas is allowed to permeate the membrane, diluting the water vapor content of the permeate. In all three cases, the driving force for the permeation of the water vapor in the feed gas is provided by the large water vapor partial pressure difference between the feed and the permeate.

It has been found that the vacuum and dilution methods are more efficient for dehydration of gas streams than the sweep method because they result in a better distribution of the gas that must dilute the water vapor that permeates the membrane, leading to a higher driving force and less feed gas loss. However, in many instances, the use of a vacuum is impractical due to, among other reasons, the logistics in supplying power to the system (e.g., dehydration of gases produced from remote oil fields), the added cost and complexity of the process, and the occasional loss in reliability when using a vacuum pump. In such cases, the dilution method is simplest, most efficient, and most economical.

For the dilution method to be practical, the membranes must be highly permeable to water vapor and relatively impermeable to the feed gas. The membrane's limited permeability to the feed gas allows just the right amount of feed gas to permeate the membrane for proper dilution of the permeate--the minimum amount required to transport water vapor across the membrane.

The composite hollow fiber lumen-side-feed membranes of the present invention are easily "tuned" to the proper permselectivity: the transport of water vapor across the membrane is determined by the resistance of the highly permeable support fiber to water vapor permeation, while the transport of the gas to be dried is determined by the resistance of the selective coating on the lumens of the fibers to gas transport.

As mentioned above, the second key element to the successful development of a hollow fiber dehydration system is the design of the module. It must contain enough membrane area to efficiently carry out the desired separation and have the proper hydraulic characteristics on the permeate side of the membrane, which characteristics involve the direction and nature of the flow of the permeate and the resistance to permeate flow.

Figure 1:
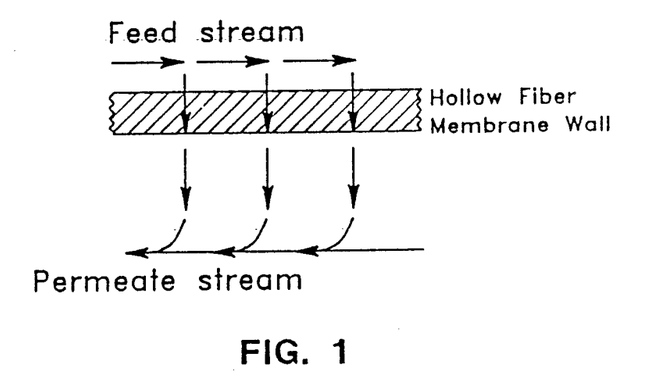
FIG. 1 is a schematic drawing showing a crossflow mode of permeate flow in a hollow fiber membrane.

At least two general flow patterns are possible on the permeate side of the module: crossflow and counterflow. In the cross-flow configuration, shown in FIG. 1, the permeate passes through the permselective layer of the membrane and then exits the module. All of the gas required to dilute the permeate stream comes from the feed gas. In cross-flow, the gas (water vapor and gas to be dried) on the permeate side of a given section of the membrane is the gas that permeated that section. Thus, it does not mix with the other gas that permeates other sections of the membrane in such a way as to affect the permeation through that section. In cross-flow, the boundary layer on the permeate side of the membrane is sufficiently large that permeation through the membrane is not affected by the composition of gas in the permeate, even if the bulk flow of permeate gas runs in a direction opposite to feed flow, as shown in the lower portion of FIG. 1; in such a configuration, as water vapor is removed from the feed stream and the water vapor partial pressure becomes small, the amount of feed gas that must permeate the membrane becomes quite large.

Figure 2:
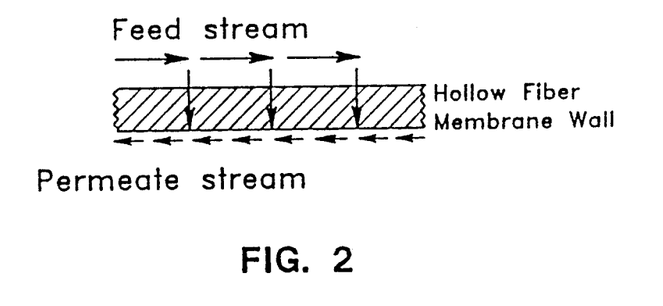
FIG. 2 is a schematic drawing showing a countercurrent flow mode of permeate flow in a hollow fiber membrane.

According to the present invention, it has been discovered that the use of a counter-flow configuration, shown in FIG. 2, which is often used in heat-exchanger design to maximize the driving force for heat transfer, combined with a module design that leads to a uniform linear velocity with no channeling on the permeate side of the membrane (referred to as "plug flow") and a low resistance hollow-fiber support, can minimize the feed gas loss. In the counter-flow configuration, the permeate passes through the membrane and mixes with the permeate gas from the raffinate end of the module in such a way as to lower the partial pressure of water in contact with the permeate side of the membrane, and exits the module in the direction opposite that of the feed flow. The gas that permeates the membrane at the drier (raffinate) end of the module moves toward the wetter (feed) end of the module after it permeates the membrane. Unlike the cross-flow configuration, in which the gas on the permeate side of a given section of membrane is the gas that permeated that section, in the counter-flow configuration the permeating dry gas from the raffinate end of the module mixes with the gas permeating a given section of membrane, thus helping to accomplish dilution. Thus, less gas is needed from the feed stream to dilute the permeate, and feed gas loss is minimized. It should be noted that, absent plug flow, true counter-flow with its consequent minimization of feed gas loss, is difficult to attain. When the composite hollow fiber membrane of the present invention with a highly permeable support is used in combination with a countercurrent feed/permeate flow, highly selective and efficient gas drying is achievable.

It has been discovered that at least three conditions must be fulfilled simultaneously to achieve true counter-flow in a gas-drying membrane module. First, the permeate flow must be in a direction opposite to that of the feed flow. This allows the permeate at the drier end of the module to dilute the permeate at the wetter end of the module. Second, the boundary layer on the permeate side of the membrane must be sufficiently small to allow mixing of (a) the bulk gas that has already permeated and is located on the outside of the fibers with (b) the gas that is permeating a given section of the membrane. This is best achieved in a module design that allows a uniform and relatively high linear velocity with no channeling on the permeate side of the membrane. Such uniform and high linear velocity is in turn achieved by having (1) a high packing density of fibers (preferably greater than 40%), and (2) uniformly-distributed fibers. Third, the resistance of the support membrane must be sufficiently small to allow mixing of (a) the bulk gas permeate with (b) the gas permeating the membrane. These three conditions are most easily satisfied by using the lumen-side feed, thin-film composite hollow fiber module of the present invention.

The "effective" permeability is defined herein as the pressure-normalized flux for the experimental conditions under which the membrane was tested. Here, the effective permeability was calculated by dividing the flux of a component by the log-mean partial-pressure driving force for that component. Thus, the effective permeability accounts for various operating variables such as temperature, dewpoint, and pressure of the feed, raffinate, and permeate streams, and mixing of the permeate gas with drier gas from the raffinate end of the module. Unless otherwise noted, in all of the Examples herein, references to air or water permeabilities or ratios of the same, are to effective permeabilities obtained at standard conditions of 100 psi(786 kPa), 35° C. dewpoint, 37° C. dry bulb for the feed; 100 psi(786 kPa), −2° C. dewpoint, 37° C. dry bulb for the raffinate; and atmospheric pressure, 23° C. dry bulb for the permeate.

Thus, according to the present invention, there is provided a dehydration module for removing water vapor from a feed gas comprising (a) a chamber having feed and raffinate ends and a permeate port near the feed end; (b) a bundle of thin film composite hollow fiber membranes arranged substantially parallel to each other and relatively uniformly spread in said chamber, preferably with a packing density of 40% to 90%, each of said composite hollow fiber membranes having an effective water vapor permeability greater than $33 \times 10^{-4}$ $cm^3/cm^2 \cdot sec \cdot cmHg$ (200 SCFH/ft$^2 \cdot$100 psi), preferably greater than $83 \times 10^{-4}$ $cm^3/cm^2 \cdot sec \cdot cmHg$ (500 SCFH/ft$^2 \cdot$100 psi), and a ratio of effective water vapor permeability to effective feed gas permeability (water vapor selectivity) of at least 30, preferably at least 100, and comprising (i) a highly permeable support fiber having an effective air permeability greater than $33 \times 10^{-4}$ $cm^3/cm^2 \cdot sec \cdot cmHg$ (200 SCFH/ft$^2 \cdot$100 psi), preferably greater than $165 \times 10^{-4}$ $cm^3/cm^2 \cdot sec \cdot cmHg$ (1000 SCFH/ft$^2 \cdot$100 psi, and most preferably greater than $330 \times 10^{-4}$ $cm^3/cm^2 \cdot sec \cdot cmHg$ (2000 SCFH/ft$^2 \cdot$100 psi), and a ratio of effective water vapor permeability to effective air permeability (water vapor selectivity) of less than 2, and (ii) a coating on the lumens of said support fiber, said coating having a ratio of effective water vapor permeability to effective feed gas permeability of at least 30, preferably at least 100; and (c) sealing means for securing and sealing said bundle of hollow fiber membranes to said chamber shell at said feed and raffinate ends so as to permit the lumens of the hollow fiber membranes to be in fluid communication with said feed gas; wherein said permeate port is in fluid communication with the outside of said hollow fiber membranes.

Further, the present invention provides a gas dehydration process comprising: (a) contacting a feed gas containing water vapor with the lumen side of thin film composite hollow fiber membranes arranged substantially parallel to each other in a chamber, each of said hollow fiber membranes having an effective water vapor permeability greater than $33 \times 10^{-4}$ $cm^3/cm^2 \cdot sec \cdot cmHg$ (200 SCFH/ft$^2 \cdot$100 psi), preferably greater than $83 \times 10^{-4}$ $cm^3/cm^2 \cdot sec \cdot cmHg$ (500 SCFH/ft$^2 \cdot$100 psi) and a ratio of effective water vapor permeability to effective feed gas permeability (water vapor selectivity) of at least 30, preferably at least 100, and comprising (i) a highly permeable support fiber having an effective air permeability greater than $33 \times 10^{-4}$ $cm^3/cm^2 \cdot sec \cdot cmHg$ (200 SCFH/ft$^2 \cdot$100 psi), preferably greater than $165 \times 10^{-4}$ $cm^3/cm^2 \cdot sec \cdot cmHg$ (1000 SCFH/ft$^2 \cdot$100 psi), and most preferably greater than $330 \times 10^{-4}$ $cm^3/cm^2 \cdot sec \cdot cmHg$ (2000 SCFH/ft$^2 \cdot$100 psi), and a ratio of effective water vapor permeability to effective air permeability (water vapor selectivity) of less than 2, and (ii) a coating on the lumens of said support fiber, said coating having a ratio of effective water vapor permeability to effective feed gas permeability of at least 30, preferably at least 100; (b) permitting water in said feed gas to permeate from the lumens to the outside of said hollow fiber membranes; and (c) removing permeated water from said chamber at a point near the feed end of said chamber.

Figure 3:
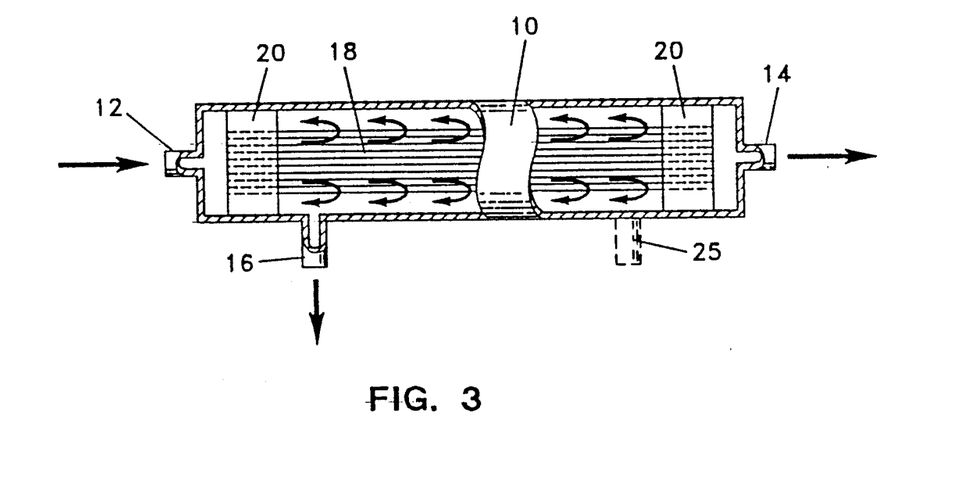
FIG. 3 is a schematic drawing of an exemplary embodiment of the present invention.

FIG. 3 shows a cross sectional schematic of a chamber or module 10 having a feed port 12, a raffinate port 14, a permeate port 16, thin-film composite hollow fiber membranes 18 arranged substantially parallel to each other, and sealing means 20, such as plugs of thermoplastic or thermosetting polymeric potting compound, at both ends of the module that secure and seal the bundle 18 to the module at both ends so as to permit the inside or lumens of the hollow fiber membranes to be in fluid communication with the feed gas. The feed gas to be dried is fed to the inside or lumens of the hollow fibers, thereby permitting water vapor in the feed gas to permeate from the lumens to the outside of each fiber, which in turn causes the permeate port 16 to be in fluid communication with the outside of the fibers, and further requires the permeate to flow countercurrent to the direction of flow of the feed gas, as indicated by the bent arrows in FIG. 3. Note that, with such an arrangement, relatively drier gas from the permeate at the raffinate end of the module is mixed with relatively more wet gas from the permeate at the feed end of the module, which when combined with the module design of the present invention and a high-permeability support, enhances the driving force of water, as explained above.

Figure 4A:
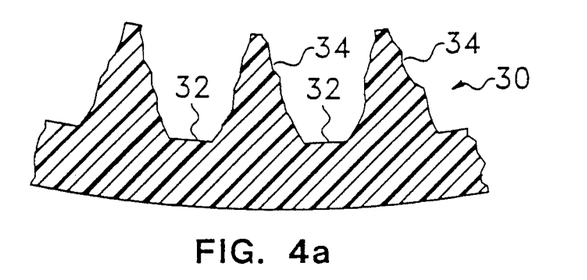
FIGS. 4a–4c are conceptualized schematic drawings of a cross-sectional portion of the hollow fiber membrane of the present invention.
Figure 4B:
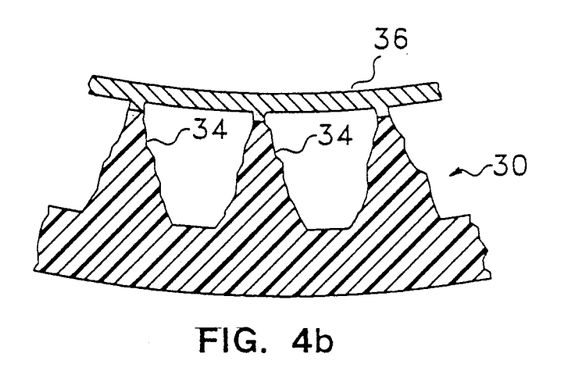
Figure 4C:
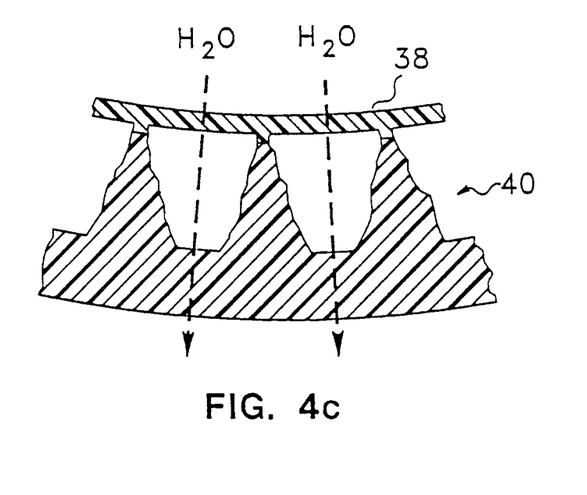

FIGS. 4a–4c are conceptualized schematics showing the formation of a thin-film composite membrane 40 by, for example, interfacial polymerization. FIG. 4a shows a cross sectional view of an enlarged portion of the wall of an asymmetric polymeric hollow fiber support 30 that is highly permeable and having high porosity, the pores being formed by alternating valleys 32 and projections 34. The support fiber is contacted with an aqueous prepolymeric solution which adheres as a layer 36 to the projections 34, extending into the support a short distance as indicated in FIG. 4b. Next, as shown in FIG. 4c, the prepolymeric layer 36 is either crosslinked or copolymerized into a thin dense permselective film 38 which permits permeation of water vapor in the direction shown, from the lumens to the outside of the composite hollow fiber membrane 40.

As mentioned above, the support fiber must be highly permeable to air, with an effective permeability thereto of greater than $33 \times 10^{-4}$ $cm^3/cm^2 \cdot sec \cdot cmHg$ (200 SCFH/ft$^2 \cdot$100 psi), preferably greater than $165 \times 10^{-4}$ $cm^3/cm^2 \cdot sec \cdot cmHg$ (1000 SCFH/ft$^2 \cdot$100 psi), and most preferably greater than $330 \times 10^{-4}$ $cm^3/cm^2 \cdot sec \cdot cmHg$ (2000 SCFH/ft$^2 \cdot$100 psi), and must have a ratio of effective water vapor permeability to effective air permeability (water vapor selectivity) of less than 2. Suitable polymeric materials for formation of the support fiber by conventional methods are polypropylene, polyvinylideneflourides, polyetherimides, polyimides, polysulfones, polyethersulfones, and polyphenylsulfones. Suitable inorganic materials for the support fiber include porous tubes of glass, ceramic and metal.

Although the coating 38 on the support fiber may be virtually any compatible polymeric composition that has a water vapor selectivity of at least 30, the preferred class of compositions is a silicon-containing polymer or copolymer. Especially preferred silicon-containing polymers are polysiloxanes, poly(dialkylsiloxanes), polymethylhydrosiloxanes, alkylsilyls, alkoxysilyls, arylsilyls and aryloxysilyls.

Such silicon-containing polymers (or prepolymers) may be rendered copolymerizable by first adding a functional group that is polymerizable in a condensation reaction with any compatible copolymerizable compound, such as acid halides, sulfonyl halides, isocyanates, phosphonyl or phosphoryl halides, amidocarbonyl halides, amines, alcohols and thiols. The corresponding coatings would comprise copolymers of silicon-containing polymers and, for example, polyamides (when the functional groups are amines and acid halides), polysulfonamides (when the functional groups are amines and sulfonyl halides), polyureas (when the functional groups are amines and isocyanates), polyphosphoesters (when the functional groups are alcohols and phosphonyl or phosphoryl halides), polyesters (when the functional groups are alcohols and acid halides), polythioesters (when the functional groups are acid halides and thiols), and polyurethanes (when the functional groups are alcohols and isocyanates). Copolymers are preferred as, relative to silicon-containing homopolymers, the copolymers tend to have higher selectivity toward water over the gas to be dried.

The resulting composite hollow fiber membrane has an effective water vapor permeability of greater than $33 \times 10^{-4}$ cm$^3$/cm$^2$·sec·cmHg (>200 SCFH/ft$^2$·100 psi), preferably greater than $83 \times 10^{-4}$ cm$^3$/cm$^2$·sec·cmHg (500 SCFH/ft$^2$·100 psi) and a ratio of effective water vapor permeability to effective feed gas permeability (water vapor selectivity) of at least 30, preferably at least 100. Higher selectivities for water vapor over the gas to be dried are preferred if minimizing gas loss is desired, and are obtained by using a coating with a low gas permeability. For best effect, the composite fibers should be arranged substantially parallel to each other as shown in FIG. 3. In addition, the spacing between the fibers should be such that any axial dispersion effects on the permeate side of the fiber, i.e., diffusion of water vapor against the countercurrent flow, are minimized. A packing density of 40%–90% of the cross sectional area of the chamber or module is adequate for most applications.

The feed gas may comprise virtually any condensable or noncondensable gas containing water vapor in any concentration. Typical applications include dehumidification of air, lower hydrocarbons such as those containing 1 to 3 carbon atoms per molecule, and acid gases such as carbon dioxide, sulfur dioxide and ammonia.

In operation, the water vapor-containing feed gas is fed through feed port 12 to the lumens of hollow fiber membranes in bundle 18, at a pressure greater than the pressure at permeate port 16, and preferably at a pressure of at least 0.5 atm (51 kPa), most preferably at >1 atm (101 kPa). A vacuum may be applied to the permeate port 16 to lower the permeate pressure relative to the feed gas pressure. Water vapor preferentially permeates first the selective thin coating 38 on the lumens of the composite hollow fiber membrane 40, which coating is semipermeable to the feed gas, then the highly permeable support wall in the direction indicated in FIG. 4c. Because of the arrangement of the fibers and configuration of the module, water vapor permeate flows countercurrent to the flow of the feed gas, exiting the module through permeate port 16. The dried feed gas exits through raffinate port 14.

EXAMPLE 1

Highly permeable microporous-walled hollow support fibers were prepared at 23° C. from a casting solution consisting of 25 wt% polyvinylidene flouride (PVDF), 10 wt% cyclohexanone, 5 wt% polyvinyl pyrrolidene (PVP), all in dimethylacetamide (DMAC). The casting solution was pressurized to 15 psi (203 kPa) with compressed helium gas, forcing the casting solution at a flow rate of about 1.5 g/min to a spinneret having an inner needle diameter of 250 microns and an outer orifice diameter of 1300 microns. The tip of the spinneret was 1 cm above a precipitation bath comprising fresh water at 15° C. An aqueous lumen-forming solution consisting of 30 vol % DMAC was fed to the spinneret simultaneously, and the flow regulated with a needle valve.

The precipitated fibers had an average dwell time of 20 seconds in the precipitation bath and, contemporaneously with precipitation, were drawn up on a take-up reel, which was then immersed in a second fresh water bath where they were rinsed for several hours at 20° C., then allowed to air dry at room temperature for 24 hours. The so-formed hollow fiber supports had an average inside diameter of 450 microns, average outside diameter of 724 microns, and average wall thickness of 137 microns.

Burst strength by internal pressurization was determined by selecting a representative hollow fiber, forming a loop with the fiber by connecting both ends to a common fitting on a static hydraulic water pressure valve, and then pressurizing the inside of the fiber at a rate which increased about 10 psi (69 kPa) per second until the fiber actually burst. The hollow fiber supports so prepared had average burst pressure of 292 psi (2000 kPa).

Air permeability of the hollow fiber supports was determined by incorporating them in bundles into modules of substantially the design shown in FIG. 3, using a two-part polyurethane-based potting compound, then internally pressurizing the hollow fibers with oxygen and measuring the oxygen permeation rate, then calculating the air permeability therefrom, which was approximately $1.3 \times 10^{-4}$ cm$^3$/cm$^2$·sec·cmHg (8 SCFH/ft$^2$·100 psi). The ratio of effective water vapor permeability to effective air permeability was 1.3.

EXAMPLE 2

Another batch of highly permeable microporous-walled hollow support fibers was prepared at 30° C. from a casting solution consisting of 22 wt % polyethersulfone (PES), 10 wt % n-propanol (NPr), and 5 wt % H$_2$O, all in DMAC, using the procedure described in Example 1 with the exceptions noted. The flow of casting solution to the spinneret was about 2.0 g/min. The aqueous lumen-forming solution consisted of 60% DMAC. The inner needle diameter was 405 microns. The precipitation bath temperature was 25° C., and the precipitated fibers had an average dwell time of 15 seconds.

The hollow support fibers so prepared were annealed by immersing them in 90° C. water for 60 minutes after they had been rinsed for several hours at 20° C., then allowed to air dry at room temperature for 24 hours. The so-prepared fibers had an average inside diameter of 600 microns, average outside diameter of 820 microns, average wall thickness of 110 microns, average burst pressure of 300 psi (2100 kPa) and an effective air permeability of approximately $250 \times 10^{-4}$ $cm^3/cm^2 \cdot sec \cdot cmHg$ (1500 SCFH/ft$^2 \cdot$100 psi). The ratio of effective water vapor permeability to air permeability of the fiber was 1.3.

EXAMPLES 3-12

Additional highly permeable microporouswalled hollow support fibers were prepared in substantially the same manner as in Example 1 from the casting solutions listed in Table I, and varying the other parameters noted in Table I; temperatures of the casting solution were 30° C. for Examples 3-11 and 50° C. for Example 12. The so-prepared fibers had average burst pressures, dimensions, and effective air permeabilities as indicated in Table II.

same configuration as that shown in FIG. 3 with a polyurethane potting composition, then tested by passing a humid air stream having a 34° C. dew point through the fiber lumens at 100 psi (786 kPa) and adjusting the feed flow rate (equal to the sum of permeate and raffinate rates) to produce a raffinate stream with a $-1.6°$ C. dew point. Effective water permeability was $341 \times 10^{-4}$ $cm^3/cm^2 \cdot sec \cdot cmHg$ (2080 SCFH/ft$^2 \cdot$100 psi) and air permeability was $1.1 \times 10^{-4}$ $cm^3/cm^2 \cdot sec \cdot cmHg$ (6.7 SCFH/ft$^2 \cdot$100 psi), thus yielding a water vapor selectivity of 310. Percent air loss from the feed stream to the permeate, calculated as $100 \times$ [permeate rate/feed rate], was 12.4%, or close to the theoretical value of 10.1%.

For comparison, the uncoated microporous hollow support fibers of Examples 2 and 4 were tested in the same air stream and adjusting the feed flow rate to

TABLE I

| Ex. No. | wt % Casting Solution Components | | | | | Vol % DMAC Lumen-Forming Solution | Inner Needle Diam (um) | Polymer Flow Rate (g/min) | Ppn Bath Temp (°C.) | Ppn Bath Dwell (sec) | Annealing Conditions | |
|---|---|---|---|---|---|---|---|---|---|---|---|---|
| | PES | DMAC | NPr | H$_2$O | PVP | | | | | | Temp (°C.) | Time (min) |
| 3 | 27 | 57.25 | 10 | 4.5 | 0.25 | 62 | 250 | 1.5 | 30 | 15 | 100 | 30 |
| 4 | 24 | 61.0 | 10 | 5.0 | 0 | 60 | 635 | 4.0 | 28 | 12 | 90 | 60 |
| 5 | 24 | 64.0 | 10 | 2.0 | 0 | 70 | 254 | 1.5 | 20 | 15 | 90 | 30 |
| 6 | 27 | 63.0 | 10 | 0 | 0 | 60 | 635 | 5.5 | 16 | 10 | 90 | 45 |
| 7 | 25 | 63.0 | 10 | 0 | 2.0 | 70 | 250 | 5.5 | 16 | 14 | 90 | 45 |
| 8 | 25 | 63.0 | 10 | 0 | 2.0 | 70 | 250 | 5.5 | 16 | 12 | 90 | 45 |
| 9 | 24 | 64.0 | 10 | 2.0 | 0 | 70 | 250 | 5.5 | 16 | 11 | 90 | 45 |
| 10 | 24 | 64.0 | 10 | 2.0 | 0 | 60 | 250 | 5.5 | 17 | 14 | 90 | 45 |
| 11 | 22 | 63.0 | 10 | 5.0 | 0 | 60 | 405 | 2.0 | 25 | 15 | 90 | 60 |
| 12 | 22 | 63.0 | 10 | 5.0 | 0 | 62 | 405 | 2.0 | 25 | 15 | 90 | 60 |

TABLE II

| Ex. No. | Burst Pressure psi (10$^3$ kPa) | Effective Air Permeability*() | Fiber Dimensions (microns) | | min. wall | Water* Air |
|---|---|---|---|---|---|---|
| | | | i.d. | o.d. | | |
| 3 | 860 (5.9) | 58 (352) | 284 | 627 | 171 | 1.3 |
| 4 | 270 (1.9) | 200 (1200) | 635 | 813 | 83 | 1.3 |
| 5 | 420 (2.9) | 180 (1105) | 330 | 482 | 64 | 1.3 |
| 6 | 290 (2.0) | 2 (13) | 1067 | 1397 | 102 | 1.3 |
| 7 | 145 (1.0) | 25 (153) | 1372 | 1651 | 127 | 1.3 |
| 8 | 160 (1.1) | 19 (113) | 1295 | 1575 | 114 | 1.3 |
| 9 | 200 (1.4) | 89 (540) | 1181 | 1372 | 89 | 1.3 |
| 10 | 155 (1.1) | 180 (1092) | 1321 | 1524 | 76 | 1.3 |
| 11 | 300 (2.1) | 260 (1565) | 575 | 808 | 99 | 1.3 |
| 12 | 260 (1.8) | 530 (3175) | 600 | 828 | 114 | 1.3 |

*$10^{-4}$ cm$^3$/cm$^2 \cdot$ sec $\cdot$ cmHg
**SCFH/ft$^2 \cdot$ 100 psi
***Effective water selectivity, or ratio of effective water permeability to effective air permeability

EXAMPLE 13

A selective coating or film was formed on the inner surface or lumens of the support fibers of Example 2 by first forcing an aqueous 3 wt % polyethyleneimine (PEI) solution into the fiber lumens for 2 minutes at room temperature. The PEI solution was then allowed to drain from the fibers before a second solution consisting of 3 wt % dicarboxypropyl acid chloride-terminated polydimethylsiloxane (DISAC) in hexane was forced into the fiber lumens for 2 minutes at room temperature. The second solution was drained from the fiber lumens for 2 minutes. This coating procedure was then repeated. The hollow support fibers so prepared were then dried for 15 hours forcing air through the lumens of the fibers at room temperature.

The PEI-DISAC-coated microporous hollow support fibers were formed into an 0.074 m$^2$ (0.8 ft$^2$) bundle and incorporated into a module of substantially the produce a raffinate stream with a $-2.5°$ C. dewpoint. Percent air loss from the feed stream to the permeate, calculated as $100 \times$ [permeate rate/feed rate], was 85%, or nearly seven-fold greater than that of the coated fibers.

EXAMPLES 14-18

Selective PEI/DISAC coatings were formed on the lumens of the PES support fibers of Example 11 using the coating technique described in Example 13, but varying the coating composition and number of coats as noted in Table III. The "Water/Air" entries in Table III and in all tables herein are the values for the ratios of effective water vapor permeabilities to effective feed gas permeabilities (or water vapor selectivities) for the composite hollow fiber membranes used for drying. All composite fibers were dried for 15 hours and incorporated into 0.074 m$^2$ (0.8 ft$^2$) modules

TABLE III

| Ex. No. | Concentration (wt %) PEI | Concentration (wt %) DISAC | No. Coats | Feed Rate* () | Water Permeability* (****) | Water Air | % Air Loss |
|---|---|---|---|---|---|---|---|
| 14 | 3 | 3 | 2 | 0.71 (1.39) | 67 (408) | 25 | 21 |
| 15 | 3 | 3 | 3 | 0.30 (0.60) | 70 (424) | 53 | 16 |
| 16 | 3 | 3 | 4 | 0.44 (0.87) | 66 (401) | 79 | 15 |
| 17 | 4 | 2 | 2 | 0.43 (0.85) | 75 (460) | 59 | 16 |
| 18 | 10 | 4 | 2 | 0.13 (0.25) | 86 (525) | 310 | 12 |

*$cm^3/cm^2 \cdot sec$
**$SCFM/ft^2$
***$10^{-4} cm^3/cm^2 \cdot sec \cdot cmHg$
****$SCFH/ft^2 \cdot 100 psi$

EXAMPLE 19

Selective coatings were formed on the lumens of the support fibers of Example 3 by first forcing an aqueous 4% PEI solution into the fiber lumens for 1 minute at room temperature. The PEI solution was then displaced by forcing a second solution, containing 4 wt % DISAC in hexane, through the fiber lumens. After 30 seconds contact time, residual DISAC/hexane solution was displaced with compressed nitrogen for about 30 seconds. Then a solution of 0.1% trimesoylchloride (TMC) in hexane was forced into the fiber lumens and immediately allowed to drain. The PEI-DISAC-TMC-coated fibers were then dried for 15 hours by forcing air through the fiber lumens at room temperature.

The coated fibers were then tested in the manner described in Example 13 by passing a humid air stream having a 25° C. dewpoint through the lumens and adjusting the feed flow rate to produce the raffinate streams noted in Table IV. For the tests in which the permeate pressure was 0.23 psia (0.11 kPa), a permeate-side vacuum pump was used.

TABLE IV

| Feed Rate* () | Raffinate Dewpoint °C. | Permeate Pressure psia (kPa) | Permeability* (**) Water | Permeability* (****) Air | Water Air | % Air Loss |
|---|---|---|---|---|---|---|
| 1.04 (2.04) | −9.2 | 0.23 (0.11) | 52 (315) | 0.26 (1.6) | 200 | 1 |
| 0.10 (0.20) | 3.7 | 13.3 (6.2) | 8.0 (49) | 0.28 (1.7) | 29 | 15 |
| 0.07 (0.13) | 9.5 | 13.3 (6.2) | 1.1 (7) | 0.28 (1.7) | 4 | 21 |
| 0.05 (0.10) | 6.0 | 13.3 (6.2) | 1.3 (8) | 0.28 (1.7) | 5 | 28 |

*$cm^3/cm^2 \cdot sec$
**$SCFM/ft^2$
***$10^{-4} cm^3/cm^2 \cdot sec \cdot cmHg$
****$SCFH/ft^2 \cdot 100 psi$

EXAMPLE 20

A selective coating was formed on the lumens of the support fibers of Example 4 by forcing a 0.5 wt % polytrimethylsilyl propyne (PTMSP) in cyclohexene solution through the fiber lumens for about 2 minutes at room temperature. The PTMSP solution was displaced from the lumens using compressed nitrogen, and the coating then heat cured in an 80° C. oven for 30 minutes with circulating hot air forced through the lumens. A second coating of the same PTMSP solution was then applied by again forcing the PTMSP solution through the lumens while applying a vacuum to the outside of the fiber walls for 2 minutes at room temperature, then displacing the PTMSP solution with nitrogen. Cyclohexene residue was removed by forcing air through the lumens for 2 hours, until no cyclohexene could be detected in the air emerging from the fiber ends. The fibers were again heat cured in an 80° C. oven for 30 minutes with circulating hot air being forced through the lumens.

The PTMSP-coated fibers were then tested in the manner described in Example 13 by passing a humid airstream having a 34° C. dewpoint through the lumens, and adjusting the feed flow rate to produce a raffinate stream having a −1.6° C. dewpoint. Effective water vapor permeability was $37 \times 10^{-4}$ cm$^3$/cm$^2$·sec·cmHg (223 SCFH/ft$^2$·100 psi), while effective air permeability was $10 \times 10^{-4}$ cm$^3$/cm$^2$·sec·cmHg (62 SCFH/ft$^2$·100 psi), yielding a water vapor selectivity of 3.6, or well below the preferred value of at least 30. Air loss from the feed stream to the permeate was undesirably high at 49%.

EXAMPLE 21

A selective coating was formed on the lumens of the support fibers of Example 5 by forcing an aqueous 4 wt % PEI solution through the fiber lumens for about 2 minutes, then displacing the PEI solution by forcing a second solution containing 0.5 wt % toluene-2,4-diisocyanate (TDI) in hexane through the lumens, to commence crosslinking. After 30 seconds contact time, residual TDI/hexane solution was removed with compressed nitrogen, and the fibers were then heat cured in a 100° C. oven for 30 minutes with circulating hot air being forced through the lumens, to complete crosslinking.

The crosslinked PEI-coated fibers were tested in the manner described in Example 13 by passing a humid air stream having a 25° C. dewpoint through the lumens, and adjusting the feed flow rate to produce the raffinate dewpoints noted in Table V. A permeate-side vacuum pump was used to produce the 0.39 psia (0.18 kPa) permeate pressures.

TABLE V

| Feed Rate* () | Raffinate Dewpoint °C. | Permeate Pressure psia (kPa) | Permeability* (****) Water | Air | Water Air | % Air Loss |
|---|---|---|---|---|---|---|
| 0.29 (0.57) | −42.0 | 0.39 (0.18) | 24 (147) | 0.61 (3.7) | 40 | 12 |
| 0.54 (1.06) | −36.0 | 0.39 (0.18) | 51 (313) | 0.49 (3.0) | 104 | 5 |
| 1.04 (2.06) | −4.7 | 0.39 (0.18) | 46 (279) | 0.46 (2.8) | 100 | 3 |
| 1.55 (3.06) | 4.4 | 0.39 (0.18) | 46 (279) | 0.44 (2.7) | 103 | 2 |
| 0.29 (0.57) | 14.7 | 13.5 (6.3) | 10 (64) | 0.64 (3.9) | 16 | 10 |

*$cm^3/cm^2 \cdot sec$
**$SCFM/ft^2$
***$10^{-4} cm^3/cm^2 \cdot sec \cdot cmHg$
****$SCFH/ft^2 \cdot 100\ psi$

EXAMPLE 22

Microporous-walled polypropylene hollow support fibers having pores of 0.02 micron and an inner diameter of 400 microns were obtained from Hoechst Celanese Corporation of Charlotte, N.C. (CELGARD X-20). A selective coating was formed on the lumens of the support fibers by first drawing an aqueous 3 wt % PEI solution into the lumens for 2 minutes. The PEI solution was then displaced by forcing a second solution containing 3 wt % DISAC in hexane through the lumens. The time to displace the PEI solution by the DISAC solution was 60 seconds. After 60 seconds contact time, residual DISAC/hexane solution was removed with compressed air. This coating procedure was repeated, and fibers were dried for 15 hours by forcing air through the fiber lumens at room temperature.

The PEI/DISAC-coated fibers were tested in the manner described in Example 13 by passing a humid air stream having a 35° C. dewpoint through the lumens, and adjusting the feed flow rate to produce a raffinate stream having a −2.3° C. dewpoint. Effective water vapor permeability was $44 \times 10^{-4}$ $cm^3/cm^2 \cdot sec \cdot cmHg$ (270 $SCFH/ft^2 \cdot 100\ psi$), while effective air permeability was $0.57 \times 10^{-4}$ $cm^3/cm^2 \cdot sec \cdot cmHg$ (3.5 $SCFH/ft^2 \cdot 100$ psi), yielding a water vapor selectivity of 77. Air loss from the feed stream to the permeate was 15.5%.

For comparison, a module containing the same fibers without any coating was prepared and tested in the same manner on the same feed stream with the same raffinate dewpoint; air loss to the permeate stream approached 100%.

EXAMPLE 23

A selective coating was formed on the lumens of the support fibers of Example 1 using the coating procedure described in Example 22.

The PEI/DISAC-coated fibers were tested in the same manner as described in Example 13, with the feed stream having a dewpoint of 35° C. and the raffinate stream having a dewpoint of −2.4° C. Effective water vapor permeability was $5.9 \times 10^{-4}$ $cm^3/cm^2 \cdot sec \cdot cmHg$ (36 $SCFH/ft^2 \cdot 100$ psi), while effective air permeability was $0.15 \times 10^{-4}$ $cm^3/cm^2 \cdot sec \cdot cmHg$ (0.9 $SCFH/ft^2 \cdot 100$ psi), yielding a water vapor selectivity of 40. Air loss from the feed stream to the permeate was 18%.

For comparison, uncoated support fibers were tested on a feed stream having a 30° C. dewpoint, with the raffinate stream adjusted to a −2° C. dewpoint. The feed gas flow rate was 0.13 $cm^3/cm^2 \cdot sec$ (0.26 $SCFM/ft^2$), the effective water permeability $4.6 \times 10^{-4}$ $cm^3/cm^2 \cdot sec \cdot cmHg$ (28 $SCFH/ft^2 \cdot 100$ psi), the ratio of water permeability to air permeability 3.8, and the air loss 46%.

EXAMPLE 24

A selective coating was formed on the lumens of the support fibers of Example 11 using the coating procedure described in Example 22.

The PEI/DISAC-coated fibers were tested in the same manner as described in Example 13, with the raffinate stream having a dewpoint of −20° C. Effective water vapor permeability was $163 \times 10^{-4}$ $cm^3/cm^2 \cdot sec \cdot cmHg$ (1020 $SCFH/ft^2 \cdot 100$ psi), while effective air permeability was $0.28 \times 10^{-4}$ $cm^3/cm^2 \cdot sec \cdot cmHg$ (1.7 $SCFH/ft^2 \cdot 100$ psi), yielding a water vapor selectivity of 600. Air loss to the feed stream was 16.3%.

EXAMPLE 25

A selective coating was formed on the lumens of the support fibers of Example 12 using the coating procedure described in Example 22.

The PEI/DISAC-coated fibers were tested in the same manner as described in Example 13, with the feed stream having a dewpoint of 35° C. and the raffinate stream having a dewpoint of −20° C. Effective water vapor permeability was $119 \times 10^{-4}$ $cm^3/cm^2 \cdot sec \cdot cmHg$ (725 $SCFH/ft^2 \cdot 100$ psi), while effective air permeability was $2.1 \times 10^{-4}$ $cm^3/cm^2 \cdot sec \cdot cmHg$ (13 $SCFH/ft^2 \cdot 100$ psi), yielding a water vapor selectivity of 58. Air loss to the feed stream was 22%.

EXAMPLE 26

A selective coating was formed on the lumens of the support fibers of Example 11 using the coating procedure described in Example 22 except that the time to displace the PEI solution from the lumens by the DISAC solution was adjusted to 10 seconds.

The PEI/DISAC-coated fibers were tested in the same manner as described in Example 13, with the results shown in Table VI.

TABLE VI

| Feed Rate* () | Dewpoint (°C.) Feed | Raff. | Permeability* (****) Water | Air | Water Air | % Air Loss |
|---|---|---|---|---|---|---|
| 0.40 (0.77) | 35 | −3 | 293 (1755) | 0.90 (5.4) | 325 | 12.7 |
| 0.26 (0.51) | 35 | −20 | 95 (571) | 0.93 (5.6) | 102 | 19.2 |

*$cm^3/cm^2 \cdot sec$
**$SCFM/ft^2$
***$10^{-4} cm^3/cm^2 \cdot sec \cdot cmHg$
****$SCFH/ft^2 \cdot 100\ psi$

EXAMPLES 27-31

These examples demonstrate that effective water vapor permeability of the thin-film composite hollow fiber membrane of the present invention is increased by increasing the air permeability of the uncoated support fiber.

Microporous-walled hollow support fibers were prepared as described in Examples 6-10. The hollow fiber supports so prepared were incorporated into 0.093m² (1 ft²) modules in the same manner described in Example 13.

Nitrogen permeabilities were determined by internally pressurizing the hollow support fibers contained in the modules with nitrogen and measuring the rate at which nitrogen passed through the hollow fiber walls by means of a gas flow meter connected to the module's permeate port. Effective air permeabilities calculated from the nitrogen permeabilities so obtained are set forth in Table VII.

Selective PEI/DISAC coatings were formed on the lumens of each of the same support fibers using the coating procedure described in Example 14.

The coated fibers were then tested for water vapor permeability and air loss from feed to permeate by passing a 75 psi (517 kPa) water vapor-containing air stream having a dewpoint of 22.6±2.7° C., through the lumens, and adjusting the feed flow rate to produce a raffinate stream with a dewpoint of 8.6±2.6° C. This test data also is shown in Table VII, and demonstrates that changes in the hollow support fibers that increase air permeability unexpectedly result in higher effective water permeability in the composite or coated hollow support fiber.

TABLE VII

| Ex. No. | Uncoated Permeability* (**) | | Coated Permeability* (**) | | Water Air | % Air Loss |
|---|---|---|---|---|---|---|
| | Air | Water | Air | Water | | |
| 27 | 11 (65) | 13 (81) | 0.61 (3.7) | 12 (71) | 19 | 2.8 |
| 28 | 17 (106) | 22 (133) | 0.20 (1.2) | 23 (140) | 120 | 1.1 |
| 29 | 31 (189) | 39 (236) | 1.1 (6.4) | 31 (191) | 30 | 3.9 |
| 30 | 97 (593) | 122 (741) | 2.7 (16.6) | 42 (254) | 15 | 6.8 |
| 31 | 102 (620) | 127 (775) | 1.2 (7.4) | 49 (301) | 41 | 3.0 |

*$10^{-4}$ cm³/cm² · sec · cmHg
**SCFH/ft² · 100 psi

EXAMPLE 32

This example demonstrates the importance of a countercurrent feed/permeate flow by comparing such flow with a cross-flow.

A selective PEI/DISAC coating was formed on the lumens of the support fibers of Example 11 using the coating procedure described in Example 13 and the coating composition of Example 14. The coated hollow support fibers were gathered into an 0.042m² (0.45 ft²) bundle and secured to the inside of a module using a two-part polyurethane-based potting compound as a plug at each end. The design of the module was such that a permeate port was located at each end of the module just inside of the potting plugs at each end, as shown in FIG. 3 taken with element 25, which illustrates a second permeate port in phantom, downstream of permeate port 16.

The coated hollow fiber modules were then tested by passing a 100 psi (786 kPa) humid airstream having a 34° C. dewpoint through the fiber lumens in the same direction indicated in FIG. 3. First, the downstream permeate port 25 was closed and the upstream permeate port 16 was open, representing a countercurrent flow configuration, and the feed flow rate was adjusted to produce a raffinate stream with −22.3° C. dewpoint. Next, the upstream permeate port 16 was closed and the downstream permeate port 25 opened, representing a crossflow configuration, and no changes were made to feed flows. The dewpoint of the raffinate rose to 17.7° C., representing a 52% loss in drying efficiency. Finally, the downstream permeate port 25 was again closed and the upstream permeate port 16 opened, representing a countercurrent flow configuration, again without any changes to feed flows. The dewpoint of the raffinate fell to −22.7° C. Water and air permeability and air loss for all three tests are also reported in Table VIII.

TABLE VIII

| Mode | Feed Rate* () | Dewpoint (°C.) Feed | Dewpoint (°C.) Raff. | Permeability* (**) Water | Permeability* (****) Air | Water Air | % Air Loss |
|---|---|---|---|---|---|---|---|
| Counter- | 0.15 (0.29) | 32.1 | −22.3 | 79 (480) | 0.49 (3.0) | 160 | 18.7 |
| Cross- | 0.14 (0.28) | 32.2 | +17.7 | 3.1 (19) | 0.47 (2.9) | 7 | 16.8 |
| Counter- | 0.15 (0.29) | 31.9 | −22.7 | 79 (481) | 0.41 (3.1) | 155 | 18.6 |

*cm³/cm² · sec
**SCFM/ft²
***$10^{-4}$ cm³/cm² · sec · cmHg
****SCFH/ft² · 100 psi

EXAMPLE 33

This example illustrates the effectiveness of the present invention for the removal of water vapor from air at sub-atmospheric pressures, such as exist at high altitudes and in spacecraft. The PES hollow fibers of Example 9 were coated with crosslinked PEI using the technique described in Example 21. A module of substantially the configuration of FIG. 3 containing 0.69 m² (7.4 ft²) of active membrane surface area was constructed using these fibers. The module was operated on an air stream having a dewpoint of 23° C., at a feed pressure of 8 psia (3.8 KPa). The feed flow rate was set at 0.17 cm³/cm²·sec (0.33 SCFM/ft²), producing a raffinate having a dewpoint of 9° C. The effective water permeability was $48 \times 10^{-4}$ cm³/cm²·sec·cmHg (292 SCFH/ft²·100 psi), the ratio of water permeability to air permeability 5930, and the air loss 2.4%, demonstrating highly efficient gas dehydration even at subatmospheric pressures.

EXAMPLES 34-36

Composite hollow fiber membranes with PEI-DISAC-TMC coatings were fabricated in the same manner as Example 19, incorporated into three 0.093 m² (1 ft²) modules in the same manner described in Example 13 and tested on water vapor-containing methane gas as a feed gas, fed under positive pressure to the inlet port at 500 psi (3500 kPa). Feed gas composition, flow rates and results are shown in Table IX.

TABLE IX

| Example No. | Feed H$_2$O (ppm) | Feed Rate* (**) | Raffinate H$_2$O (ppm) | Efficiency H$_2$O Removal | % Gas Loss |
|---|---|---|---|---|---|
| 34 | 35 | 1.1 (2.2) | 4 | 89% | 8.3 |
| 35 | 45 | 1.9 (3.7) | 14 | 69% | 5.3 |
| 36 | 47 | 0.6 (1.2) | 7 | 85% | 10.6 |

*cm$^3$/cm$^2$·sec
**SCFM/ft$^2$

COMPARATIVE EXAMPLE

The operation of a composite membrane module of the type described in Example 13 (identified as Module "A") was compared to the operation of the homogeneous asymmetric membrane module of Example 6 of U.S. Pat. No. 4,738,201 (identified as Module "B"), both in a countercurrent flow mode, with the results shown in Table X.

TABLE X

| Module | Feed Press psi (kPa) | Feed Dewpoint (°C.) | Raffinate Rate* () | Raffinate Dewpoint °C. | Water Permeability* (****) | Water Air | % Air Loss |
|---|---|---|---|---|---|---|---|
| A | 100 (690) | 34 | 0.43 (0.85) | −1.6 | 330 (2012) | 310 | 12 |
| B | 105 (723) | 27 | 0.08 (0.16) | −4.3 | 7.6 (46) | 14.4 | 27 |

*cm$^3$/cm$^2$·sec
**SCFM/ft$^2$
***10$^{-4}$ cm$^3$/cm$^2$·sec·cmHg
****SCFH/ft$^2$·100 psi As is apparent, the composite membrane module of the present invention (Module A) dries much more efficiently than the homogeneous asymmetric membrane (Module B) in that (1) more water vapor is removed with a significantly lower air loss (12% for Module A, or close to the theoretical value of 10%, as opposed to 27% for Module B), and (2) the flow of dry gas produced per membrane surface area was more than five times as great.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A gas dehydration process comprising:
   (a) contacting a feed gas containing water vapor with the lumen side of thin film composite hollow fiber membranes arranged substantially parallel to each other in a chamber, each of said composite hollow fiber membranes having an effective water vapor permeability greater than $33 \times 10^{-4}$ cm$^3$/cm$^2$·sec·cmHg (200 SCFH/ft$^2$·100 psi) and a ratio of effective water vapor permeability to effective feed gas permeability of at least 100 and comprising
      (i) a highly permeable support fiber having an effective air permeability greater than $33 \times 10^{-4}$ cm$^3$/cm$^2$·sec·cmHg (200 SCFH/ft$^2$·100 psi) and a ratio of effective water vapor permeability to effective air permeability of less than 2, and
      (ii) a coating on the lumens of said support fiber, said coating having a ratio of effective water vapor permeability to effective feed gas permeability of at least 100; and
   (b) permitting water in said feed gas to permeate from the lumens to the outside of said hollow fiber membranes; and
   (c) removing permeated water from said chamber at a point near the feed end of said chamber.

2. The process of claim 1 wherein the support fiber has an effective air permeability greater than $330 \times 10^{-4}$ cm$^3$/cm$^2$·sec·cmHg (2000 SCFH/ft$^2$·100 psi).

3. The process of claim 1 wherein the feed gas is air.

4. The process of claim 1 wherein the feed gas comprises hydrocarbons containing one to three carbon atoms per molecule.

5. The process of claim 1 wherein the feed gas comprises acid gases.

6. The process of claim 1 wherein the pressure of the feed gas is greater than the pressure of the permeate.

7. The process of claim 6 wherein the feed gas is at a pressure of at least 0.5 atm (50 kPa).

8. The process of claim 6 wherein the feed gas is at a pressure of at least 1 atm (101 kPa).

9. The process of claim 6 wherein a vacuum is used to lower the pressure of the permeate.

10. A dehydration module for removing water vapor from a feed gas comprising:
    (a) a chamber having feed and raffinate ends and a permeate port near the feed end;
    (b) a bundle of thin film composite hollow fiber membranes arranged substantially parallel to each other in said chamber, each of said composite hollow fiber membranes having an effective water vapor permeability greater than $33 \times 10^{-4}$ cm$^3$/cm$^2$·sec·cmHg (200 SCFH/ft$^2$·100 psi) and a ratio of effective water vapor permeability to effective feed gas permeability of at least 100 and comprising
       (i) a highly permeable support fiber having an effective air permeability greater than $33 \times 10^{-4}$ cm$^3$/cm$^2$·sec·cmHg (200 SCFH/ft$^2$·100 psi) and a ratio of effective water vapor permeability to effective air permeability of less than 2, and
       (ii) a coating on the lumens of said support fiber, said coating having a ratio of effective water vapor permeability to effective feed gas permeability of at least 100; and
    (c) sealing means for securing and sealing said bundle of hollow fiber membranes to said chamber shell at said feed and raffinate ends so as to permit the lumens of the hollow fiber membranes to be in fluid communication with said feed gas;
    wherein said permeate port is in fluid communication with the outside of said hollow fiber membranes.

11. The dehydration module of claim 10 wherein said support fiber has an effective air permeability greater than $330 \times 10^{-4}$ cm$^3$/cm$^2$·sec·cmHg (2000 SCFH/ft$^2$ 100 psi).

12. The dehydration module of claim 10 wherein said support fiber of said thin film composite hollow fiber membrane is selected from polypropylene, polyvinylideneflourides, polyetherimides, polyimides, polysulfones, polyethersulfones, polyphenylsulfones, porous glass, porous ceramic, and porous metal.

13. The dehydration module of claim 10 wherein said coating on the lumens of said support fiber comprises a silicon-containing polymer.

14. The dehydration module of claim 13 wherein said silicon-containing polymer is selected from polysiloxanes, poly(dialkylsiloxanes), polymethylhydrosiloxanes, alkylsilyls, alkoxysilyls, arylsilyls and aryloxysilyls.

15. The dehydration module of claim 13 wherein said silicon-containing polymer is first rendered copolymerizable with a compatible copolymerizable compound.

16. The dehydration module of claim 15 wherein said compatible copolymerizable compound is selected from acid halides, sulfonyl halides, isocyanates, phosphoryl halides, amidocarbonyl halides, amines, alcohols and thiols.

17. The dehydration module of claim 10 wherein said sealing means comprises plugs of polymer selected from thermoplastic polymers and thermosetting polymers.

* * * * *